(12) United States Patent
Jain et al.

(10) Patent No.: US 10,040,886 B2
(45) Date of Patent: Aug. 7, 2018

(54) CASTOR OIL DERIVED HYDROXY FUNCTIONAL ACRYLIC COPOLYMERS FOR SURFACE COATING APPLICATIONS

(71) Applicant: ASIAN PAINTS LTD., Mumbai (IN)

(72) Inventors: Rajeev K. Jain, Navi Mumbai (IN); Vrijesh K. Singh, Navi Mumbai (IN); M. L. V. Apparao, Navi Mumbai (IN); Mosongo Moukwa, Chapel Hill, NC (US)

(73) Assignee: Asian Paints Ltd., Mumbai (IN)

( * ) Notice: Subject to any disclaimer, the term of this patent is extended or adjusted under 35 U.S.C. 154(b) by 0 days.

(21) Appl. No.: 14/892,111

(22) PCT Filed: Jul. 22, 2013

(86) PCT No.: PCT/IN2013/000454
§ 371 (c)(1),
(2) Date: Nov. 18, 2015

(87) PCT Pub. No.: WO2014/188438
PCT Pub. Date: Nov. 27, 2014

(65) Prior Publication Data
US 2016/0090431 A1    Mar. 31, 2016

(30) Foreign Application Priority Data

May 21, 2013 (IN) .......................... 1803/MUM/2013

(51) Int. Cl.
| | |
|---|---|
| C08F 222/10 | (2006.01) |
| C08F 242/00 | (2006.01) |
| C09D 125/14 | (2006.01) |
| C08F 212/08 | (2006.01) |
| C08G 18/08 | (2006.01) |
| C08G 18/62 | (2006.01) |
| C08G 81/02 | (2006.01) |
| C09D 5/00 | (2006.01) |
| C09D 135/06 | (2006.01) |
| C09D 175/04 | (2006.01) |
| C09J 175/04 | (2006.01) |

(52) U.S. Cl.
CPC ...... *C08F 222/1006* (2013.01); *C08F 212/08* (2013.01); *C08F 242/00* (2013.01); *C08G 18/08* (2013.01); *C08G 18/627* (2013.01); *C08G 81/024* (2013.01); *C09D 5/002* (2013.01); *C09D 125/14* (2013.01); *C09D 135/06* (2013.01); *C09D 175/04* (2013.01); *C09J 175/04* (2013.01); *C08F 2222/1026* (2013.01)

(58) Field of Classification Search
CPC .................................................. C08F 242/00

USPC .......................................................... 525/123
See application file for complete search history.

(56) References Cited

U.S. PATENT DOCUMENTS

| | | | | |
|---|---|---|---|---|
| 2,767,151 | A * | 10/1956 | Dunlap ................. | C08F 212/08 524/914 |
| 3,454,509 | A * | 7/1969 | Fry .................... | C09D 133/066 525/133.5 |
| 4,640,801 | A * | 2/1987 | Simone ................. | C08F 242/00 528/245.5 |
| 4,877,455 | A * | 10/1989 | Brauer .................. | C08F 242/00 106/243 |
| 5,432,221 | A * | 7/1995 | Polaski ................. | C08F 212/12 524/310 |
| 7,098,291 | B2 * | 8/2006 | Brinkman .............. | C08G 18/12 528/74.5 |
| 2003/0045609 | A1 * | 3/2003 | Thames ................. | C07C 69/732 523/161 |
| 2005/0203246 | A1 * | 9/2005 | Thames .................. | C08L 91/00 524/785 |
| 2010/0311897 | A1 * | 12/2010 | Williams .............. | C08F 242/00 524/556 |
| 2011/0190439 | A1 * | 8/2011 | Hendrickx ................ | C08F 8/44 524/523 |
| 2011/0294946 | A1 * | 12/2011 | Craun ................... | C08F 289/00 524/556 |
| 2016/0090431 | A1 * | 3/2016 | Jain ........................ | C09J 175/04 524/507 |

FOREIGN PATENT DOCUMENTS

| | | |
|---|---|---|
| WO | 2010051346 A1 | 5/2010 |
| WO | 2010100121 A1 | 9/2010 |
| WO | 2012131050 A1 | 10/2012 |

OTHER PUBLICATIONS

International Search Report and Written Opinion dated Mar. 21, 2014 for related PCT patent application No. PCT/IN2013/000454.

* cited by examiner

*Primary Examiner* — Michael M Dollinger
(74) *Attorney, Agent, or Firm* — D'Ambrosio & Menon, PLLC; Usha Menon

(57) ABSTRACT

Acrylic polyols comprising hydroxy functional acrylic copolymers/resin involving an acrylic backbone having modified castor oil sourced hydroxyl functionalities and synthesized by co-reacting modified hydroxy functional Castor Oil with variety of acrylic monomers, styrene or its derivatives and optionally hydroxyalkyl acrylates/methacrylates and ethylenic monomer through solution polymerization in presence of an initiator. The hydroxyl functionality is solely or partially imparted through renewable Castor Oil wherein the resins were synthesized at upto 100% solids and at hydroxyl values ranging from 25-150 (mg KOH/gm). The synthesized resins when cured with suitable polyisocyanates or amino resin cross-linkers provided tough, glossy and chemical & weather resistant coatings.

23 Claims, No Drawings

CASTOR OIL DERIVED HYDROXY FUNCTIONAL ACRYLIC COPOLYMERS FOR SURFACE COATING APPLICATIONS

FIELD OF THE INVENTION

The present invention relates to acrylic polyols comprising hydroxy functional acrylic copolymers/resin involving an acrylic backbone having modified castor oil sourced hydroxyl functionalities and a process thereof and more particularly, relates to solvent borne hydroxyl bearing acrylics for end use and application in high performance clear or pigmented coatings for variety of substrates like wood, metal, plastics and concrete etc. across the decorative & industrial segments. Advantageously, said acrylic polyols of the present invention may be employed for the synthesis of ambient curing 2K polyurethane finishes with suitable polyisocyanates, 1K polyurethane finishes with blocked isocyanates or in single component stoving finishes with amino resins like melamine formaldehyde or urea formaldehyde resins as cross linkers. More advantageously, the present invention in providing for hydroxy functional acrylic resins with hydroxyl functionality solely or partially sourced from modified castor oil in presence of alkyl acrylates, alkyl methacrylates, styrenic monomers & optionally hydroxy-alkylacrylates/methacrylates and vinyl/ethylenic monomers brings renewable component as well as economy to the resin and consequently to the coating formulations.

BACKGROUND ART

Hydroxy-functional acrylic resins having molecular weight (typically 5000 to 1000000) are valuable reaction intermediates for high-performance coatings. These resins are typically synthesized by copolymerizing hydroxyalkylacrylate or hydroxyalkylmethacrylates monomers or mixture thereof with other alkyl acrylate/alkyl methacrylate monomers such as butyl acrylate, butyl methacrylate, methyl methacrylate etc, along with styrene, methacrylic acid and suitable initiator. Since Hydroxyalkylacrylate/methacrylate monomers are fairly expensive, inexpensive ways to introduce hydroxyl functionality into acrylics while maintaining desired coatings performance is an area of interest.

In order to meet the basic objective of achieving economy and performance, polymer scientists have used vegetable oil or its derivatives with acrylics and some of such references are being mentioned here.

Use of Castor oil to modify thermosetting acrylic based coating compositions have been reported m U.S. Pat. No. 3,454,509 to impart flexibility, hardness and low baking schedule to the coating. This prior art relates to addition of small quantity of castor oil or its derivative into the coating recipe containing thermosetting acrylic co-polymer and cured with hexamethoxymethyl melamine cross-linker.

U.S. Pat. No. 3,454,509 describes the use of castor oil as a reactive flexibilizer (as an additive) where hydroxy group of castor oil does not react with interpolymer, instead it reacts with cross linker i.e. melamine formaldehyde and hence form the part baked coating. Castor oil in physical blending form doesn't react with interpolymer instead it acts as plasticizer. In another U.S. Pat. No. 5,432,221, hydroxy functional acrylic polymers have been reported which are compatible with castor oil. Such acrylic polymers find application in multi curable coating compositions comprising of hydroxy functional acrylic, polyisocyanate and castor oil. Use of castor oil provides flexibility and wetting to the polyurethane coatings prepared thereof but does not impart any hydroxy functionality to the acrylic polymers.

U.S. Pat. No. 5,432,221 describes use of acrylate resin based on petroleum based hydroxyl monomers (like Hydroxy Ethyl Acrylate/methacrylates etc.) which are highly reactive and hence to make it flexible castor oil and polyisocyanates have been used wherein the polyisocyanates react separately with acrylate resin and castor oil.

International patent No. WO 2010/100121 A1 discloses the synthesis of hydroxy functional oil polyol acrylic graft copolymers. This was accomplished by heating epoxidized vegetable oil and a hydroxy functional material in the presence at an acid catalyst to prepare hydroxy functional oil poyol and reacting the same with a mixture of ethylenically unsaturated monomer composition in presence of an initiator. The polymers prepared thereof were cured with suitable cross linker to prepare coating compositions for food & beverage packaging containers.

Epoxidized vegetable oil though a renewable material based polymer are entirely different in structure compared to castor oil grafted acrylate resin of the present invention. Examples cited in WO2010/100121 utilise, various commercial grades of epoxidized vegetable oil like Vikolox, Vikoflex 7170, Vikoflex 7190, Drapex 6.8, Drapex 10.4 etc having low iodine value (between 1-3) indicating almost no unsaturation and therefore leaves little scope of chemical grafting of monomers through unsaturation.

US2005/0203246 A1 discloses that ethylenically unsaturated vegetable oils like soya bean off and Linseed oil have been modified by the addition of an enophile or dienophile having acid, ester or anhydride functionality. The modified vegetable oil is then reacted with functional vinyl monomer to form a vegetable oil derivative. Such derivatives were found useful in forming latexes for coatings.

WO2012/131050A1 is about aqueous acrylic copolymerisate dispersions obtained of A) subjecting the monomer mixture comprising a) at least one hydroxyl functional vinyl, acrylate or methacrylate monomer and b) at least one acid functional vinyl, acrylate, or methacrylate monomer and c) at least one vinyl; acrylate, or methacrylate monomer that is not hydroxyl functional and not acid functional to free radical polymerization in the presence of d) 10-40 wt % based on the total weight of the monomers a), b), c) of at least one polyol selected from the group consisting of castor oil and castor oil based polyol derivatives having a number average molecular weight Mn of 600 to 1200 g/mol and an OH value of 160 to 400 mg KOH/g, yielding an acrylic copolymerisate composition, B) adding a neutralizing agent to the acrylic copolymerisate composition of step A), and C) dispersing the mixture resulting from step B) in water.

The dispersion of this prior art is thus prepared involving castor oil and hydroxyl acrylates like hydroxyl ethyl methacrylate, hydroxyl propyl methacrylates prepared in water miscible co-solvent that is water borne (aqueous) with sufficient carboxylic functionality/acid value to enable neutralization with suitable amines followed by dilution with water meant exclusively for waterborne coatings. The acid value is between 7 and 25 mg KOH/g.

WO2010/051346A1 is directed to a process of cross-linkable aqueous copolymer dispersion of a water dilutable copolymer A, comprising the steps of 1. polymerizing by radical copolymerization a) 5 to 64% by weight of a reaction product of at least one fatty acid having at least one ethylenic double bond and one hydroxyl group in the molecule with a polyalcohol having a hydroxyl functionality of 2 to 8 and b) 36 to 95% by weight of at least one additional unsaturated monomer b), wherein the at least one additional unsaturated monomer b) contains hydrophilic ionic groups and wherein the % by weight of monomers a) and b) are adding up to 100%, wherein the reaction product of at least one ethylenic double bond and one hydroxyl group in the molecule with a polyalcohol having a hydroxyl functionality of 2 to 8 is castor oil.

2. neutralizing the hydrophilic ionic groups of the copolymer A before and/or during dispersing or dissolving the copolymer A in an aqueous carrier.

3. dispersing or dissolving the neutralized copolymer A in an aqueous carrier, wherein the at least one additional unsaturated monomer b) is polymerized in presence of at least 20% by weight of the total amount of the reaction product a), thereby forming a copolymer A) having an acid number of at least 10 mg KOH/g solids.

This prior art thus teaches aqueous copolymeric dispersions prepared in water miscible co-solvent involving castor oil and a hydroxyl functional monomer with sufficient carboxylic functionality/acid value to enable neutralization with suitable amines followed by dilution with water which is meant exclusively for waterborne coatings. The acid value is high of 15-80 mg KOH/g solids.

As apparent from the above state of the art the provision of hydroxy functional acrylic copolymer utilizing renewable material as co-reactant as a source of hydroxyl functionality in the said resin with complete elimination or partial reduction in incorporation of hydroxy functionality through hydroxyl functional acrylic monomers is at a nascent stage and such renewable material based copolymers made available in the state of the art are water borne with high acid numbers required for aqueous dispersion for neutralization with amines to favour water dispersibility also involving acrylic acid and methacrylic acid as essential ingredients.

While the above cited arts describe the use of castor oil as an additive or other modified oils to be incorporated in hydroxy functional acrylics, there is a long felt need in the art for the provision of having renewable material derived hydroxy functional acrylic copolymer, wherein the renewable material would be a co-reactant for resin synthesis to economize, provide latitude and renewable component to the said resin and the coating compositions and other compositions attained therefrom. There is also a need in the art to provide for economical and durable clear/pigmented coatings which coating would have high renewable material content, high solid content and would be compatible with VOC (volatile organic content) exempt solvents to be solvent borne and could be prepared irrespective of the involvement of conventionally used petroleum based acrylic/methacrylic acid and irrespective of incorporation of hydroxy functionality through hydroxy functional acrylic monomers.

OBJECTS OF THE INVENTION

It is thus the primary object of the present invention to provide for acrylic polyols comprising hydroxy functional acrylic copolymers/resin wherein the acrylic backbone would have castor oil sourced hydroxyl functionalities.

It is another object of the present invention to provide for a process of synthesis of said hydroxy functional acrylic copolymers/resin wherein the hydroxyl functionality would be solely or partially sourced from castor oil based renewable material.

It is yet another object of the present invention to provide for said hydroxy functional acrylic copolymers/resin that would enable to economize, provide latitude and renewable component to the resin and In return to the coating and other compositions attained thereof.

It is another object of the present invention to provide for said renewable material derived hydroxy functions acrylic copolymer, wherein the renewable material would be a co-reactant for resin synthesis to facilitating durable clear/pigmented coatings which coating would favourably have high renewable content, high solid content and would be compatible with VOC (volatile organic content) exempt solvents.

It is still another object of the present invention to provide for said renewable material derived hydroxy functional acrylic copolymer which in having a renewable material as a co-reactant to reach to the polymer would still be compatible with cost effective monomers selected from styrene and its derivatives and ethylenic monomers.

It is another object of the present Invention to provide for said renewable material derived hydroxy functional acrylic copolymer which in having a renewable materiel as a co-reactant to reach to said polymer would be compatible with other specialty monomers like fluorinated acrylics, silane functional vinyl/acrylics, crosslinking acrylics i.e. diacrylates/methacrylates, functional acrylics with dual reactivity and mixtures thereof to modify or improve end-use properties such as surface gloss, hardness, chemical resistance, and other properties.

SUMMARY OF THE INVENTION

Thus according to the basic aspect of the present invention there is provided acrylic polyols comprising hydroxy functional acrylic copolymers/resin involving an acrylic backbone having carboxylic acid anhydride modified castor oil as hydroxyl functional monomer.

It was significantly thus found by way of the present invention that though long alkyl chains are present in the castor oil to prohibit other monomers to penetrate and react on its unsaturation point, yet the same could be incorporated in the resin backbone at the levels as high as upto 50 wt % by selective modification of the castor oil which could not be achieved here to before to provide resin with ranch desired beneficial renewable content in the resin backbone.

It was thus unexpectedly found by way of the present invention that when said castor oil was modified by reactants selected from carboxylic acid anhydride in-situ, the same could be incorporated as the co-reactant at the levels of upto 50% for resin formation, to advantageously economize the resin and enhance its renewable content wherein the need to involve petroleum based acrylic/methacrylic acid and hydroxy functional acrylic monomers for incorporation of hydroxy functionality while preparing the acrylic polyol based resin could be eliminated.

Importantly therefore the hurdle of incorporation of castor oil as the co-reactant at high levels of upto 50% for resin formation with an acrylic backbone having castor oil sourced hydroxyl functionalities, to bring economy to the resin and to enhance the renewable content of the resin, could thus be circumvented by way of the present invention by modification of the castor oil with reactants selected from acid anhydride that was found to favor co-polymer formation with selective combinations of specific monomers.

Surprisingly therefore, it was found by way of the present invention that while simple castor oil as a hydroxy bearing monomer when incorporated only at the levels of upto 10 wt % without any modification in combination with other monomers only resulted in a acrylic resin that is not useful commercially in the complete absence of any curing properties, the same castor oil when suitably modified with selective ingredients selected from carboxylic acid anhydride in selective combination with different monomers selected from acrylates, methacrylates, ethylenic, styrene derivatives helps achieve castor oil incorporation to the levels of upto 50 wt % to provide for hydroxy functional acrylic copolymers/resin with high renewable material content as the desired end product and having said acrylic backbone with castor oil sourced hydroxyl functionalities.

In the absence of the above said modification, the resultant acrylic polyol co-polymer remained clear only at OH values of <30 mg KOH/gm and is devoid of any curing properties thus not suitable to achieve desired cross-linking for coating applications. Acrylic polyols prepared without carboxylic acid anhydride modification at desired hydroxyl values of 40-90 mg KOH/gm turned into unusable hazy mass with no commercial use.

Apart from providing good compatibility to achieve clear acrylic polyols, acidity imparted by carboxylic acid anhydride modified castor oil further acts as catalyst/adhesion promoter while curing with various cross-linkers for coating applications thus eliminating the need of conventionally used petroleum based acrylic/methacrylic acid and hydroxy functional acrylic monomers for incorporation of hydroxy functionality in the acrylic polyols used in conventional coating applications.

Also thus the process of the present invention in employing special reaction conditions and ingredient combination at special selective levels aids in having modified castor oil as the co-reactant and a source of hydroxy functionality in the said resin wherein complete elimination of incorporation of hydroxy functionality through hydroxyl functional acrylic monomers in the acrylic resin could be realized.

Significantly, in the present invention, the castor oil being the major reactive renewable component at acrylate resin wherein chemical grafting has been carried out with different monomers (acrylates, methacrylates, ethylenics) on the unsaturation present in castor oil resulting in the co-polymer to reach to said resin and the durable compositions attained thereof, the hurdle to reach to the said resin was circumvented by suitably modifying the castor oil in-situ with selective carboxylic acid anhydrides as ingredients.

According to another aspect of the present invention there is provided said acrylic polyols involving a copolymerized product of said modified castor oil and monomers including alkyl or aryl acrylates, alkyl methacrylates, styrene, derivative of styrene, vinyl/ethylenic type monomers and their derivatives and mixtures thereof.

Preferably in said acrylic polyols said monomers preferably include vinyl aromatic monomers, unsaturated nitriles, vinyl esters, vinyl ethers, vinyl halides, vinylidene halides, unsaturated anhydrides, unsaturated dicarboxylic acids, acrylic and methacrylic acids, acrylamide, methacrylamide, fluorinated acrylics, silane functional vinyl/acrylics, cross-linking acrylics like diacrylates/methacrylates, functional acrylics with dual reactivity, conjugated dienes and mixtures thereof.

Preferably said acrylic polyols optionally includes hydroxy alkyl acrylates/methacrylate and a vinyl/ethylenic monomers.

Advantageously, said acrylic polyols comprising high solids of upto 100% and renewable content of upto 50% having weight average molecular weights within the range of about 10000 to 100000 and having hydroxyl value within the range of about 25 to about 150 mg KOH/gm and having a glass transition temperatures (Tg) within the range of about −20° C. to about 50° C.

More advantageously, said acrylic polyols preferably have average molecular weight preferably in the range of 15000-50000 and wherein the preferred hydroxyl value is in the range of 40 to about 90 mg KOH/gm.

According to another aspect of the present invention there is provided a process for the synthesis of said acrylic polyols comprising hydroxy functional acrylic copolymers/resin comprising the steps of (a) providing said modified castor oil;
(b) providing said monomers for addition at a desired rate;
(c) providing free radical initiator for addition at a desired rate;
(d) copolymerizing said ingredients (a) and (b) in the presence of solvents in a desired temperature range adapted to control the free radical polymerization free of any chain-transfer agent to obtain hydroxy functional acrylic copolymers/resin involving an acrylic backbone having carboxylic acid anhydride modified castor oil as hydroxy functional monomer.

According to another preferred aspect of the said process for the synthesis of acrylic polyols said modified castor oil is used in the levels based on the desired hydroxyl value of the resin.

According to yet another preferred aspect of the said process the synthesis of acrylic polyols wherein modified castor oil is provided within the range of about 10-50 wt % and more preferably in the range of about 10-35 wt. % based on resin solids; wherein the monomers are provided in the range of 20 to 60 wt %, preferably in the range of 35 to 60 wt %; wherein the free-radical initiator is in the range of about 0.5 to about 10 wt. % based on the amount of monomers preferably within the range of about 1 to about 5 wt. %; most preferably in the range from about 1.5 to about 3.5 wt. %, According to another preferred aspect of the said process the reaction temperature range is within about 80° C. to about 160° C. and preferably is in the range of 100° C. to about 150° C. and wherein the free-radical initiator is gradually added to the other components of the reaction during the course of the polymerization and preferably wherein the addition of the free-radical initiator and the monomer mixture to the reaction mixture is maintained at the same rate.

According to yet another preferred aspect of the said process the solvents employed does not interfere with free-radical polymerization reaction or react with the monomers and include solvents selected from ethers, esters, ketones, aromatic and aliphatic hydrocarbons, glycol ether esters, or mixtures thereof.

According to another preferred aspect of the said process the free radical initiators includes peroxide, hydroperoxide, or azo compound preferably the initiators with a decomposition temperature greater than about 100° C. and selected from tert-butyl hydroperoxide, di-tert-butyl peroxide; tert-butyl perbenzoate, cumenehydroperoxide, dicumyl peroxide.

According to another aspect of the present invention a polyurethane composition is provided comprising a reaction product of (a) acrylic polyols comprising hydroxy functional acrylic copolymers/resin involving an acrylic backbone having carboxylic acid anhydride modified castor oil as hydroxyl functional monomer; and (b) an isocyanate.

According to yet another preferred aspect a polyurethane composition is provided wherein said isocyanates include polyisocyanate, isocyanate-terminated prepolymer or blocked isocyanates and are detected from toluene isocyanate, methylene diphenyl diisocyanate, polymeric methylene diphenyl diisocyanate, carbodiimide-modified methylene diphenyl diisocyanate, hydrogenated methylene diphenyl diisocyanate, isophoronediisocyanate, biurates & isocyanurate of hexamethylene di-isocyanate and isophoron di-isocyanate, According to yet another preferred aspect said polyurethane composition includes adhesives, sealants, coatings, and elastomers.

According to yet another preferred aspect of the present invention there is provided said process for the preparation of a polyurethane composition comprising the steps of reacting
(a) acrylic polyols comprising hydroxy functional acrylic copolymers/resin involving an acrylic backbone having carboxylic acid anhydride modified, castor oil as hydroxy functional monomer; with
(b) an isocyanate
at the desired NCO:OH ratio to obtain a polyurethane composition there from.

Preferably, a process for the preparation of a polyurethane composition is provided wherein said acrylic polyol and isocyanate is reacted preferably in the ratio of 1:1.

More preferably, said process comprises moisture curing in case of excess NCO groups in said polyurethane product.

According to another aspect of the present invention there is provided thermoset polymers comprising a reaction product of
(a) acrylic polyols comprising hydroxy functional acrylic copolymers/resin involving an acrylic backbone having carboxylic acid anhydride modified castor oil as hydroxy functional monomer; and
(b) an amino resin Preferably in said thermoset polymers said amino resin includes melamine resin selected from hexamethoxymethylmelamines, such as Cymel 303 (Cytec Industries) and Setamine US 138 (Nuplex Industries).

According to another aspect of the present invention there is provided said process for the synthesis of thermoset polymers comprising the steps of reacting
(a) acrylic polyols comprising hydroxy functional acrylic copolymers/resin involving an acrylic backbone having carboxylic acid anhydride modified castor oil as hydroxy functional monomer; with
(b) an amino resin to obtain said thermoset polymers there from.

According to another aspect of the present invention there is provided a coating composition comprising
(a) acrylic polyols comprising hydroxy functional acrylic copolymers/resin involving an acrylic backbone having castor oil based hydroxyl functionalities;
(b) Crosslinkers
(c) pigments.

Preferably, a coating composition is provided that is adapted for a dry film thickness ranging from 20-75 microns favouring at least one or more i.e. primer, base coat and top coat. The present invention thus relates to the synthesis of hydroxy-functional acrylic copolymers for variety of surface coating applications. All acrylic polyols essentially contain hydroxy functional acrylic monomers which are derived from petroleum based depleting resource. In the present work a noble approach has been used to introduce hydroxyl functionality in the acrylic backbone using renewable Castor Oil. Apart from acrylic monomers, other monomers like styrene, styrene derivatives or vinyl & ethylenic derivatives have also been used to bring economy to the synthesized copolymer based on castor oil or its suitable modifications with or acid anhydride.

Due to unique chemical structure of castor oil comprising about 90% hydroxyl bearing Ricinoleic acid, it has hydroxyl value of about 160-168 (mg KOH/gm). Its incorporation by modifying it into the acrylic backbone provides series of hydroxy functional acrylic resins depending on the type and concentration of monomers employed. Such acrylic polyols therefore provide economy, renewable component and latitude in use for the coating technologists. These hydroxyacrylate resins of the present invention are uniquely prepared in the absence of a chain-transfer agent, and do require a solvent boring processing to control the free radical polymerization.

Hydroxyl functionality of such acrylic copolymers can crosslink with different type of chemical cross linkers. Prominent of them is reaction of hydroxyl group of the acrylic polyol with —NCO of polyisocyanates to provide 1K/2K ambient temperature curing polyurethane coatings. Performance and pot life of such polyurethane coating would largely depend on the type of hydroxy acrylic copolymer and polyisocyanate used. Solvents used in polyurethane coatings are generally aliphatic/aromatic hydrocarbon, acetate ester, glycol ether ester, ketone or VOC exempt solvents like tert-butyl acetate, parachloro benzene trifluoride etc. The solvents used should be ideally free from moisture or OH functional solvents.

Urea & Melamine formaldehyde resins are other widely used chemical cross linkers for hydroxy acrylates for single component industrial finishes at baking temperature of 100° C.-160° C. for 10-40 minutes. Solvents used in such urea formaldehyde/melamine formaldehyde resin crosslinked coatings arealphatic/aromatic hydrocarbons, alkyl alcohols, glycol ethers and esters etc.

Coating compositions comprising hydroxy acrylic copolymers based on present inventions can be successfully used for primer surfacer, base coat and top coat depending on the binder type, its concentration and quantity/type of pigments used in suitable solvent medium. Typically such coating compositions may be designed & applied to achieve dry film thickness ranging from 20-75 microns per coat. Suitable application equipments for the application of such coating compositions are brush, roller, air spray, airless spray or electrostatic spray.

DETAILED DESCRIPTION OF THE INVENTION

As discussed hereinbefore the present invention provides for carboxylic acid anhydride modified castor oil as a hydroxyl bearing monomer which when suitably modified with selective ingredients reacts with different monomers selected from acrylates, methacrylates, ethylenic, styrene derivatives to achieve hydroxy functional acrylic copolymers/resin wherein the acrylic backbone has castor oil sourced hydroxyl functionalities.

The present invention also details the synthesis of hydroxy acrylic resins which can be cured with suitable curing agents for use on treated/untreated metal, wood, plastic, concrete and cementitious substrates etc. Preferable areas for use would be finishes for automobiles, appliances, machineries, general/agricultural equipments, furniture, refineries & chemical plants, etc.

Such hydroxy-functional acrylates of the present invention comprise carboxylic acid anhydride modified castor oil in combination with alkyl acrylate/alkyl methacrylates, styrene and optionally hydroxy alkyl acrylates/methacrylate and a vinyl/ethylenic monomer.

Castor oil is a vegetable oil obtained from the castor bean and is a colorless to pale yellow liquid with mild or no odor or taste. It is a triglyceride in which approximately 90 percent of fatty acid chains are ricinoleic acid. Oleic and linoleic acid are the other significant components. Ricinoleic acid, a monounsaturated, 18-carbon fatty acid, is unusual in that it has a hydroxyl functional group on the 12th carbon. This functional group causes ricinoleic acid (and castor oil) to be unusually polar, and also allows chemical derivatization that is not practical with most other vegetable oils. It is the hydroxyl group which makes castor oil and ricinoleic acid valuable as chemical feedstocks. Castor oils for modification and useful in the invention have the general structure as given hereunder.

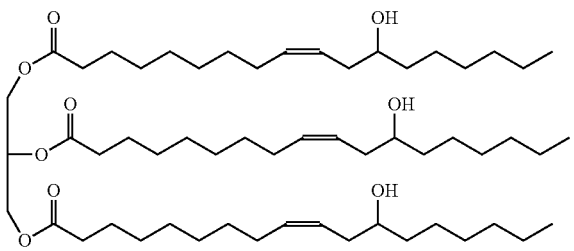 [SMILES: CCCCCCC(O)C/C=C\CCCCCCCC(=O)OCC(COC(=O)CCCCCCC/C=C\CC(O)CCCCCC)OC(=O)CCCCCCC/C=C\CC(O)CCCCCC]

Modified castor oil is prepared by reacting castor oil with an acid anhydride (Maleic anhydride, Succinic anhydride etc.). The amount of modified castor oil used in the acrylic copolymer of the invention depends on many factors, but most important of them is the desired hydroxyl value of the resin. Generally, it is preferred to incorporate into the resin an amount of modified castor oil within the range of about 10-50 wt. %; a more preferred range is from about 10-35 wt % based on resin solids.

The present invention provides for a process for making hydroxy-functional acrylic resins wherein the process comprises copolymerizing a $C_1$-$C_{12}$ alkyl or aryl acrylate or methacrylate monomer, modified castor oil generated insitu, styrenics and optionally hydroxyalkyl acrylate/methacrylate, ethylenic monomer in presence of a free-radical initiator. Examples include, but are not limited to, methyl acrylate, methyl methacrylate, ethyl acrylate, butyl acrylate, butyl methacrylate, lauryl methacrylate and the like, and mixtures thereof. It is often advantageous to use mixtures of various acrylates and methacrylates to control the resin glass-transition temperature. The acrylate or methacrylate monomers are commonly the major component in the resin. The amount used depends on many factors, particularly the desired end use for the resin.

An ethylenic/vinyl/specialty monomer is optionally included in the hydroxyacrylate resins of the invention. The monomers are selected to modify or improve end-use properties such as surface gloss, hardness, chemical resistance, and other properties. Preferred monomers include vinyl aromatic monomers, unsaturated nitriles, vinyl esters, vinyl ethers, vinyl halides, vinylidene halides, unsaturated anhydrides, unsaturated dicarboxylic acids, acrylic and methacrylic acids, acrylamide, methacrylamide, fluorinated acrylics, silane functional vinyl/acrylics, crosslinking acrylics like diacrylates/methacrylates, functional acrylics with dual reactivity, conjugated dienes and mixtures thereof.

The acrylate resins of the invention have weight average molecular weights within the range of about 10000 to 100000 and more preferably 15000-50000. The acrylate resins have hydroxyl value within the range of about 25 to about 150 mg KOH/gm. A more preferred range is from about 40 to about 90 mg KOH/gm. The hydroxyacrylate resins preferably have glass transition temperatures (Tg) within the range of about −20° C. to about 50° C.

Present invention broadly comprises following reaction compositions for synthesizing hydroxy functional acrylic copolymers:

Use by weight of about 5-40% castor oil, 10-60% mix of alky acrylate/alkyl methacrylate, hydroxyalkyl acrylate/hydroxyalkyl methacrylate, 0.3-1.0% acrylic/methacrylic acid, 0-35% of styrene/styrene derivative or ethylenic monomer in one or mix of solvents broadly classified as aliphatic/aromatic hydrocarbon, acetate ester, glycol ether ester, ketone or VOC exempt solvents like tert-butyl acetate, parachloro benzene trifluoride etc. About 1.5-3.5 wt % free-radical initiator preferably a peroxide, hydroperoxide, or azo compound was used during the synthesis.

Use by weight of about 5-50% castor oil, 0.5-3% acid anhydride, 1050% of alky acrylate/alkyl methacrylate, and 5-45% of styrene/styrene derivative or ethylenic monomer in one or mix of solvent broadly classified as aliphatic/aromatic hydrocarbon, acetate ester, glycol ether ester, ketone or VOC exempt solvents like tert-butyl acetate, parachloro benzene trifluoride etc. About 1.5-3.5 wt % free-radical initiator preferably a peroxide, hydroperoxide, or azo compound was used during the synthesis.

The Acrylic copolymers formed were characterised for their general properties like molecular weight, glass transition temperature (Tg), hydroxy value, acid value, viscosity and % solid content. The resins were also cured with suitable polyisocyanates (2K ambient temp curing) and Urea/melamine formaldehyde resin (single component stoving finishes) in clear/pigmented system and tested for physical, mechanical, chemical & corrosion resistance and weathering properties.

The free-radical initiator is preferably a peroxide, hydroperoxide, or azo compound. Preferred initiators have a decomposition temperature greater than about 100° C. Examples include tert-butyl hydroperoxide, di-tert-butyl peroxide, tert-butyl perbenzoate, cumenehydroperoxide, dicumyl peroxide, and the like.

The amount of free-radical initiator needed varies, but is generally within the range of about 0.5 to about 10 wt % based on the amount of monomers. Preferably, the amount of free-radical initiator used is within the range of about 1 to about 5 wt %; most preferred is the range from about 1.5 to about 3.5 wt. %. Generally, it is preferred to add the free-radical initiator to the reactor gradually during the course of the polymerization; it is also desirable to match the addition rate of the free-radical initiator to the addition rate of the acrylate or methacrylate monomer mixture.

The process of the invention can be performed over a broad temperature range. Generally, the reaction temperature will be within the range of about 80° C. to about 160° C. A more preferred range is from about 100° C. to about 150° C.

The process of the present invention is performed in the presence of reaction solvent. Useful solvents include those that will not interfere with the free-radical polymerization reaction or otherwise react with the monomers. Suitable solvents include, but are not limited to, ethers, esters, ketones, aromatic and aliphatic hydrocarbons, glycol ether esters, and the like, and mixtures thereof.

In the present invention, castor oil was reacted with carboxylic acid anhydride such as maleic anhydride at specific concentration and temperature followed by co-polymerization with acrylic monomers in presence of organic solvent and initiator to achieve transparent acrylic polyol at hydroxyl value range of 40-90 mg KOH/gm suitable for further crosslinking for coating application as mentioned in Examples 3-7 demonstrated below. In the absence of such said modification, the resultant acrylic polyol co-polymer remained clear only at OH values of <30 mg KOH/gm which is not suitable to achieve desired cross-linking for coating application as mentioned in Example 8. Acrylic polyols prepared without acid anhydride such as maleic anhydride modification at desired hydroxyl values of 40-90 mg KOH/gm turned into unusable hazy mass.

Apart from providing good compatibility to achieve clear acrylic polyol, acidity imparted by said anhydride such as maleic anhydride further acts as catalyst/adhesion promoter while curing with various cross-linkers for coating applications thus eliminating the need of conventionally used petroleum based acrylic/methacrylic acid and hydroxy functional acrylic monomers for incorporation of hydroxy functionality in the acrylic polyols used in conventional coating applications as per below working Examples 3-7 of the present invention.

Said carboxylic acid anhydride such as maleic anhydride modification of castor oil not only enables 100% use of renewable hydroxy functional castor oil in the polymer backbone but also provides an acrylic copolymer which is either comparable or superior in respect of coating properties vis-à-vis acrylic polyols based on castor oil alone or petroleum based hydroxy acrylates in combination with castor oil as indicated in working Examples 1, 2 below as compared to Examples 3-7 of the present invention.

The solvent borne acrylic polyols of the present invention have acid value maximum upto 15 mg KOH/gm which acidity acts as an accelerator/adhesion promoter while curing with cross-linker unlike its utilization for the neutralization with amines meant for water borne dispersions.

A polyurethane composition is made by reacting hydroxyacrylate resins of the invention with a polyisocyanate, isocyanate-terminated prepolymer or blocked isocyanates. Suitable polyisocyanates are those well known in the polyurethane industry and include, for example, toluene diisocyanate, methylene diphenyl diisocyanate, polymeric methylene diphenyl diisocyanate, carbodimide-modified methylene diphenyl diisocyanate, hydrogenated methylene diphenyl diisocyanate, isophoronediisocyanate, biurates & isocyanurate of hexamethylene di-isocyanate and isophoron di-isocyanate and the like. Isocyanate-terminated prepolymers are made in the usual way from a polyisocyanate and a polyether polyol, polyester polyol, or the like. The polyurethane is formulated at desired NCO:OH ratio, but it is preferred to use an NCO:OH ratio close to 1. Generally all of the available NCO groups are reacted with hydroxy groups from the hydroxyacrylate resins and any chain extenders. Alternatively, an excess of NCO groups remain in the product, as in moisture-cured polyurethane. Many types of polyurethane products can be made, including, for example, adhesives, sealants, coatings, and elastomers. Examples 1-7 below illustrate polyurethane coatings prepared from an isocyanate-terminated prepolymer and anhydroxyacrylate resins of the invention.

The present invention includes thermoset polymers prepared by reacting the hydroxyacrylate resins of the invention with suitable amino resin crosslinking agents. For example, melamine-based polymer coatings can be prepared by reacting the hydroxyacrylate resins with melamine resins. Suitable melamine resins include hexamethoxymethylmelamines, such as Cymel 303 (Cytec Industries) and Setamine US 138 (NuplexIndustries). Examples 3-4 below illustrate the preparation of melamine based coatings from hydroxyacrylate resins in accordance with the present invention.

The invention is described hereunder in greater details in relation to the non-limiting examples.

Example 1

An acrylic polyol is prepared by charging the following constituents into a reactor flask fitted with a water cooled condenser, stirrer, feeding metering pump, thermocouple and a dropping funnel.

|  | Parts by Weight |
|---|---|
| Portion I | |
| Castor Oil | 22.0 |
| Xylene | 28.0 |
| Portion II | |
| Styrene | 25.0 |
| n-Butylacrylate | 11.4 |
| Methacrylic acid | 0.60 |
| Methylmethacrylate | 11.0 |
| Ditertiarybutylperoxide | 0.80 |
| Portion III | |
| Ditertiarybutylperoxide | 0.20 |
| Xylene | 1.0 |
| Total | 100.00 |

Portion I is charged into the reactor and is heated to a temperature of about (110-150° C.). Portion II is added at a uniform rate over a 2-4 hours period at 110-150° C. After Portion II is added, the reaction mixture is held at the same temperature for an additional hour. After Portion III is added, reaction is allowed to continue for 1-3 hours period. % NVM and viscosity of the resin are monitored to ensure monomer conversion. The reaction is carried out until monomer conversion is 99.0% or higher. The resulting acrylic polyol resin solution is filtered.

The resulting acrylic polyol resin is clear solution with 70% by weight of polymer solids. The polymer has a weight average molecular weight of 20073, and a hydroxyl value of 50-60 mg of KOH/gm. Acid value is between 5-9 mg of KOH/g and Viscosity is Z2-Z3 on Gardner scale at 25° C. Glass transition temperature (Tg) of the resin is approximately 0.9° C.

The above resin is evaluated in Grey paint and cured with Desmodur N 75 (Ex Bayer) at NCO/OH ratio of 1 using Xylene/methyl isobutyl ketone mixes thinner. Coatings are applied on MS panels using Spray gun at dry film thickness of 30-35 microns. Coating touch dried in 15-20 minutes and hard dried afterover night. Scratch hardness of the film using Sheen Scratch hardness tester after 48 hours found to be 1.3-1.4 Kg. Coating passed 20 Xylene rubs after 7 days curing. Initial gloss of the coating was at 93-95 at 60° gloss head. The panels exposed to QUV 313 with exposure conditions as condensation 45±1° C./4 hrs, UV 50±1° C./4 hrs at 0.55±0.01 irradiance level showed 95% gloss retention after 500 hrs and 65% gloss retention after 1000 hrs of exposure.

Example 2

An acrylic polyol is prepared by charging the following constituents into a reactor flask fitted with a wafer cooled condenser, stirrer, feeding metering pump, thermocouple and a dropping funnel.

| | Parts by Weight |
|---|---|
| Portion I | |
| Commertial Castor Oil | 17.0 |
| Mix-Xylene | 28.0 |
| Portion II | |
| Styrene | 24.0 |
| Butylacrylate | 12.4 |
| Hydroxyethylmethacrylate | 1.0 |
| Methacrylic acid | 0.6 |
| Methylmethacrylate | 15.0 |
| Tertiarybutylperbenzoate | 0.8 |
| Portion III | |
| Tertiarybutylperbenzoate | 0.2 |
| Mix-Xylene | 1.0 |
| Total | 100 |

Portion I is charged into the reactor and is heated to a temperature of about (110-150° C.). Portion II is added at a uniform rate over a 2-4 hours period at 110-150° C. After Portion II is added, the reaction mixture is held at the same temperature for an additional hour. After Portion III is added, reaction is allowed to continue for 1-3 hours period. % NVM and viscosity of the resin are monitored to ensure monomer conversion. The reaction is carried out until monomer conversion is 99.0% or higher. The resulting acrylic polyol resin solution is filtered.

The resulting acrylic polyol resin solution is clear with 70% by weight of polymer solids. The polymer has a weight average molecular weight of 10819, and a hydroxyl value of 45-55 mg of KOH/gm. Acid value is between 5-8 mg of KOH/g and Viscosity is Z1-Z2 on Gardner scale at 25° C. Glass transition temperature (Tg) of the resin is approximately 2.4° C.

The above resin was evaluated in Grey paint and cured with Desmodur N 75 (Ex Bayer) at NCO/OH ratio of 1 using Xylene/methyl isobutyl ketone mix as thinner. Coating is applied on MS panel using Spray gun at dry film thickness of 30-35 microns. The panel touch dried in 15-20 minutes and hard dried after overnight. Scratch hardness of the film using Sheen Scratch hardness tester after 48 hours found to be 1.2-1.3 Kg. Coating passed 30 Xylene rubs after 7 days curing. Initial gloss of the coating was 93-94 at 60° gloss head. The panels exposed to QUV 313 with exposure conditions as condensation 45±1° C./4 hrs, UV 50±1° C./4 hrs at 0.55±0.01 irradiance level showed 75% gloss retention after 500 hrs and 58% gloss retention after 1000 hrs of exposure.

Example 3

A Hydroxy functional acrylic copolymer is prepared by charging the following ingredients into a polymerization reactor equipped with a heating mantle, thermocouple, dropping funnel, metering pump and a reflux condenser.

| | Parts by Weight |
|---|---|
| Portion I | |
| Commercial Castor Oil | 24.0 |
| Portion II | |
| Maleic anhydride | 1.0 |
| Mix-Xylene | 29.0 |
| Portion III | |
| Styrene | 22.93 |
| Butylacrylate | 8.13 |
| Methylmethacrylate | 12.94 |
| Ditertiarybutylperoxide | 0.8 |
| PortionIV | |
| Ditertiarybutylperoxide | 0.2 |
| Mix-Xylene | 1.0 |
| Total | 100 |

Portion I is charged into the reactor and is heated to a temperature of about (110-150° C.). Portion II is charged into the reactor and is maintained at a temperature of about (110-150° C.) for 1-2 hour. Portion III is added at a uniform rate over a 2-4 hours period at 110-150° C. After Portion III is added, the reaction mixture is held at the same temperature for an additional hour. Portion IV is added, reaction is allowed to continue for 1-3 hours period. % NVM and viscosity of the resin are monitored to ensure monomer conversion. The reaction is carried out until monomer conversion is 99.0% or higher. The resulting acrylic polyol resin solution is filtered.

The resulting acrylic polyol resin solution is clear with 70% by weight of polymer solids. The polymer has a weight average molecular weight of 45975, and a hydroxyl value of 55-65 mg of KOH/gm. Add value is between 11-14 mg of KOH/g and Viscosity is Z3-Z4 on Gardner scale at 25° C. Glass transition temperature (Tg) of the resin is approximately 21.2° C.

The above resin was evaluated in Grey paint and cured with Desmodur N 75 (Ex Bayer) at NCO/OH ratio of 1 using Xylene/methyl isobutyl ketone mix as thinner. Coating is applied on MS panel using Spray gun at dry film thickness of 30-35 microns. The panel touch dried in 15-20 minutes and hard dried after over night. Scratch hardness of the film using Sheen Scratch hardness tester after 48 hours found to be 1.3-1.4 Kg. Coating passed 30 Xylene rubs after 7 days curing. Initial gloss of the coating was 93-95 at 60° gloss head. The panels exposed to QUV 313 with exposure conditions as condensation 45±1° C./4 hrs, UV 50±1° C./4 hours at 0.55±0.01 irradiance level showed 97% gloss retention after 500 hrs and 82% gloss retention after 1000 hrs of exposure.

The above resin is evaluated in white stoving finish having 22% Titanium dioxide with melamine formaldehyde resin (Setamine US 138) using hydroxy acrylate:MF ratio of about 80:20 (on resin solids) with UV absorber and HALS additives. The coating is applied to achieve 25-30 micron dry film thickness on mild steel panel and baked at 140° C./30 mins. Coating showed scratch hardness of 1.5 kg, Ericsen cupping of 8.5 and gloss of 83-85 at 20° gloss head. The panels exposed to QUV 313 with exposure conditions as condensation 50±1° C./4 hrs, UV 60±1° C./4 hrs at 0.55±0.01 irradiance level showed 98% gloss retention after 600 hrs.

Example 4

A Hydroxy functional acrylic copolymer is prepared by charging the following ingredients into a polymerization reactor equipped with a heating mantle, thermocouple dropping funnel, metering pump and a reflux condenser.

|  | Parts by Weight |
|---|---|
| Portion I | |
| Commercial Castor Oil | 25.0 |
| Portion II | |
| Maleic anhydride | 1.5 |
| Mix-Xylene | 29.0 |
| Portion III | |
| Styrene | 22.43 |
| Butylacrylate | 11.13 |
| Methylmethacrylate | 8.94 |
| Ditertiarybutylperoxide | 0.8 |
| Portion IV | |
| Ditertiarybutylperoxide | 0.2 |
| Mix-Xylene | 1.0 |
| Total | 100 |

Portion I is charged into the reactor and is heated to a temperature of about (110-150° C.). Portion II is charged into the reactor and is maintained at a temperature of about (110-150° C.) for 1-2 hour. Portion III is added at a uniform rate over a 2-4 hours period at 110-150° C. After Portion III is added, the reaction mixture is held at the same temperature for an additional hour. Portion IV is added, reaction is allowed to continue for 1-3 hours period. % NVM and viscosity of the resin are monitored to ensure monomer conversion. The reaction is carried out until monomer conversion is 99.0% or higher. The resulting acrylic polyol resin solution is filtered.

The resulting acrylic polyol resin solution is clear with 70% by weight of polymer solids. The polymer has a weight average molecular weight of 37384, and a hydroxyl number of 50-60 mg of KOH/gm. Acid value is between 12-16 mg of KOH/g and Viscosity is Z3-Z4 on Gardner scale at 25° C. Glass transition temperature (Tg) of the resin is 3.4° C.

The above resin was evaluated in Grey paint and cured with Desmodur N 75 (Ex Bayer) at NCO/OH ratio of 1 using Xylene/methyl isobutyl ketone mix as thinner. Coating is applied on MS panel using Spray gun at dry film thickness of 30-35 microns. The panel touch dried in 15-20 minutes and hard dried after over night. Scratch hardness of the film using Sheen Scratch hardness tester after 48 hours found to be 1.4-1.5 Kg. Coating passed 40 Xylene rubs after 7 days curing. Initial gloss of the coating was 92-94 at 60° gloss head. The panels exposed to QUV 313 with exposure conditions as condensation 45±1° C./4 hrs, UV 50±1° C./4 hrs at 0.55±0.01 irradiance level showed 99% gloss retention after 500 hrs and 82% gloss retention after 1000 hrs of exposure.

The above resin was evaluated in white stoving finish having 20% Titanium dioxide with melamine formaldehyde resin (Setamine US 138) using hydroxy acrylate:MF ratio of about 75:25 (on resin solids) with UV absorber and HALS. The coating is applied to achieve 25-30 micron dry film thickness on mild steel panel and baked at 140° C./30 mins. Coating showed scratch hardness of 1.6 kg, Ericsen cupping of 8.3 and gloss of 80-82 at 20° gloss head. The panels exposed to QUV 313 with exposure conditions as condensation 50±1° C./4 hrs, UV 60±1° C./4 hrs at 0.55±0.01 irradiance level showed 94% gloss retention after 600 hrs.

Example 5

A Hydroxy functional acrylic copolymer is prepared by charging the following ingredients into a polymerization reactor equipped with a heating mantle, thermocouple, dropping funnel, metering pump and a reflux condenser.

|  | Parts by Weight |
|---|---|
| Portion I | |
| Commercial Castor Oil | 25.71 |
| Portion II | |
| Maleic anhydride | 1.07 |
| Mix-Xylene | 24.0 |
| Portion III | |
| Styrene | 25.64 |
| Butylacrylate | 11.93 |
| Methylmethacrylate | 9.58 |
| Ditertiarybutylperoxide | 0.87 |
| Portion IV | |
| Ditertiarybutylperoxide | 0.2 |
| Mix-Xylene | 1.0 |
| Total | 100 |

Portion I is charged into the reactor and is heated to a temperature of about (110-150° C.). Portion II is charged into the reactor and is maintained at a temperature of about (110-150° C.) for 1-2 hour. Portion III is added at a uniform rate over a 2-4 hours period at 110-150° C. After Portion III is added, reaction mixture is held at the same temperature for an additional hour. Portion IV is added, reaction is allowed to continue for 1-3 hours period. % NVM and viscosity of the resin are monitored to ensure monomer conversion. The reaction is carried out until monomer conversion is 99.0% or higher. The resulting acrylic polyol resin solution is filtered.

The resulting acrylic polyol resin solution is clear with 75% by weight of polymer solids. The polymer has a weight average molecular weight of 88538, and a hydroxyl number of 55-65 mg of KOH/gm. Acid value is between 9-13 mg of KOH/g and Viscosity is >Z6 on Gardner scale at 25° C. Glass transition temperature (Tg) of the resin is 0.3° C.

The above resin was evaluated in Grey paint and cured with Desmodur N 75 (Ex Bayer) at NCO/OH ratio of 1 using Xylene/methyl isobutyl ketone mix as thinner. Coating was applied on MS panel using Spray gun at dry film thickness of 30-35 microns. The panel touch dried in 15-20 minutes and hard dried after over night. Scratch hardness of the film using Sheen Scratch hardness tester after 48 hours found to be 1.3-1.4 Kg. Coating passed 30 Xylene rubs after 7 days curing. Initial gloss of the coating was 92-94 at 60° gloss head. The panels exposed to QUV 313 with exposure conditions as condensation 45±1° C./4 hrs, UV 50±1° C./4 hrs at 0.55±0.01 irradiance level showed 95% gloss retention after 500 hrs and 68% gloss retention after 1000 hrs of exposure.

Example 6

A Hydroxy functional acrylic copolymer is prepared by charging the following ingredients, into a polymerization reactor equipped with a heating mantle, thermocouple, dropping funnel, metering pump and a reflex condenser.

|  | Parts by Weight |
| --- | --- |
| Portion I | |
| Commercial Castor Oil | 27.5 |
| Portion II | |
| Maleic anhydride | 1.15 |
| methoxy propyl acetate | 20.0 |
| Portion III | |
| Styrene | 26.21 |
| Butylacrylate | 9.3 |
| Methylmethacrylate | 14.8 |
| Ditertiarybutylperoxide | 0.84 |
| Portion IV | |
| Ditertiarybutylperoxide | 0.2 |
| Mix-Xylene | 1.0 |
| Total | 100 |

Portion I is charged into the reactor and is heated to a temperature of about (110-150° C.). Portion II is charged into the reactor and is maintained at a temperature of about (110-150° C.) for 1-2 hour. Portion III is added at a uniform rate over a 2-4 hours period at (110-150° C. After Portion III is added, the reaction mixture is held at the same temperature for an additional hour. Portion IV is added, reaction is allowed to continue for 1-3 hours period. % NVM and viscosity of the resin are monitored to ensure monomer conversion. The reaction is carried out until monomer conversion is 99.0% or higher. The resulting acrylic polyol resin solution is filtered.

The resulting acrylic polyol resin solution is clear with 80% by weight of polymer solids. The polymer has a weight average molecular weight of 31625, and a hydroxyl number of 55-65 mg of KOH/gm. Acid value is between 10-14 mg of KOH/g and Viscosity is >Z6 on Gardner scale at 25° C. Glass transition temperature (Tg) of the resin is 9.1° C.

The above resin was evaluated in Grey paint and cured with Desmodur N 75 (Ex Bayer) at NCO/OH ratio of 1 using Xylene/methyl isobutyl ketone mix as thinner. Coating was applied on MS panel using Spray gun at dry film thickness of 30-35 microns. The panel touch dried in 15-20 minutes and hard dried after over night. Scratch hardness of the film using Sheen Scratch hardness tester after 48 hours found to be 1.2-1.3 Kg, Coating passed 30 Xylene rubs after 7 days curing. Initial gloss of the coating was 92-94 at 60° gloss head. The panels exposed to QUV 313 with exposure conditions as condensation 45±1° C./4 hrs, UV 50±1° C./4 hrs at 0.55±0.01 irradiance level showed 90% gloss retention after 500 hrs and 68% gloss retention after 1000 hrs of exposure.

Example 7

A Hydroxy functional acrylic copolymer is prepared by charging the following ingredients into a polymerization reactor equipped with a heating mantle, thermocouple, dropping funnel, metering pump and a reflux condenser.

|  | Parts by Weight |
| --- | --- |
| Portion I | |
| Commercial Castor Oil | 24.0 |
| Portion II | |
| Maleic anhydride | 1.0 |
| Mix-Xylene | 29.0 |
| Portion III | |
| Styrene | 22.93 |
| Butylacrylate | 11.13 |
| Methylmethacrylate | 8.94 |
| Ditertiarybutylperoxide | 0.8 |
| Portion IV | |
| Ditertiarybutylperoxide | 0.2 |
| Mix-Xylene | 1.0 |
| Total | 100 |

Portion I is charged into the reactor and is heated to a temperature of about (110-150° C.). Portion II is charged into the reactor and is maintained at a temperature of about (110-150° C.) for 1-2 hour. Portion III is added at a uniform rate over a 2-4 hours period at 110-150° C. After Portion III is added, the reaction mixture is held at the same temperature for an additional hour. Portion IV is added, reaction is allowed to continue for 1-3 hours period. % NVM and viscosity of the resin are monitored to ensure monomer conversion. The reaction is carried out until monomer conversion is 99.0% or higher. The resulting acrylic polyol resin solution is filtered.

The resulting acrylic polyol resin solution is clear with 70% by weight of polymer solids. The polymer has a weight average molecular weight of 41907, and a hydroxyl number of 55-65 mg of KOH/gm. Acid value is between 8-12 mg of KOH/g and Viscosity is Z1-Z2 on Gardner scale at 25° C. Glass transition temperature (Tg) of the resin is approximately −5.1° C.

The above resin was evaluated in Grey paint and cured with Desmodur N 75 (Ex Bayer) at NCO/OH ratio of 1 using Xylene/methyl isobutyl ketone mix as thinner. Coating was applied on MS panel using Spray gun at dry film thickness of 30-35 microns. The panel touch dried in 15-20 minutes and hard dried after over night. Scratch hardness of the film using Sheen Scratch hardness tester after 48 hours found to be 1.3-1.4 Kg, Coating passed 30 Xylene rubs after 7 days curing. Initial gloss of the coating was 93-95 at 60° gloss head. The panels exposed to QUV 313 with exposure conditions as condensation 45±1° C./4 hrs, UV 50±1° C./4 hrs at 0.55±0.01 irradiance level showed 95% gloss retention after 500 hrs and 80% gloss retention after 1000 hrs of exposure.

Example 8

An acrylic polyol is prepared by charging the following constituents into a reactor flask fitted with a water cooled condenser, stirrer, feeding metering pump, thermocouple and a dropping funnel.

|  | Parts by Weight |
| --- | --- |
| Portion I | |
| Castor Oil | 10.0 |
| Xylene | 29.0 |
| Portion II | |
| Styrene | 35.0 |

-continued

| | Parts by Weight |
|---|---|
| n-Butylacrylate | 24.0 |
| Ditertiarybutylperoxide | 0.80 |
| Portion III | |
| Ditertiarybutylperoxide | 0.20 |
| Xylene | 1.0 |
| Total | 100.00 |

Portion I is charged into the reactor and is heated to a temperature of about (110-150° C.). Portion II is added at a uniform rate over a 2-4 hours period at 110-150° C. After Portion II is added, the reaction mixture is held at the same temperature for an additional hour. After Portion III is added, reaction is allowed to continue for 1-3 hours period. % NVM and viscosity of the resin are monitored to ensure monomer conversion. The reaction is carried out until monomer conversion is 99.0% or higher. The resulting acrylic polyol resin solution is filtered.

The resulting acrylic polyol resin is clear solution with 70% by weight of polymer solids. The polymer has a weight average molecular weight of 31382, and a hydroxyl value of 20-24 mg of KOH/gm. Acid value is between 1-2 mg of KOH/g and Viscosity is Z2-Z3 on Gardner scale at 25° C. Glass transition temperature (Tg) of the resin is approximately −2° C.

The above resin is evaluated in Grey paint and cured with Desmodur N 75 (Ex Bayer) at NCO/OH ratio of 1 using Xylene/methyl isobutyl ketone mix as thinner. Coatings are applied on MS panels using Spray gun at dry film thickness of 30-35 microns. Coating touch dried in 30-35 minutes and hard dried after over night. Scratch hardness of the film using Sheen Scratch hardness tester after 48 hours found to be 0.7 to 0.8 Kg. Coating merely passed 3 to 4 Xylene rubs after 7 days curing. Initial gloss of the coating was 93-95 at 60° gloss head.

The above example clearly indicates that though it was possible to synthesize acrylic copolymer with castor oil as hydroxyl bearing monomer at lower concentrations without modification with carboxylic acid anhydride, but the resultant hydroxy acrylic copolymer showed poor coating performance properties like scratch hardness and Xylene rubs when cured with polyisocyanate (Desmodur N 75) as compared to hydroxy acrylic copolymer based on castor oil modified with carboxylic acid anhydride. This is thus attributed to inferior curing and cross linking with polyisocyanate hardener on use of plain castor oil as monomer without any modification. Further, the low hydroxyl value of 20-24 mg of KOH/gm is also inadequate for sufficient coring in combination with either polyisocyanates or amino resin cross-linkers.

It is thus possible by way of the present advancement to provide for acrylic polyols comprising hydroxy functional acrylic copolymers/resin involving an acrylic backbone having modified castor oil sourced hydroxyl functionalities and a process thereof wherein the renewable content of castor oil can be incorporated in the said resin to an extent of upto 50%. Advantageously, said acrylic polyols of the present invention may be employed for the synthesis of ambient curing 2K polyurethane finishes with suitable polyisocyanates, 1K polyurethane finishes with blocked isocyanates or in single component stoving finishes with amino resins like melamine formaldehyde or urea formaldehyde resins as cross linkers. More advantageously, the present invention in providing for hydroxy functional acrylic resins with hydroxyl functionality solely or partially sourced from castor oil upon selective in-situ modification with carboxylic acid anhydride together with alkyl acrylates, alkyl methacrylates, styrenic monomers & optionally hydroxyalkylacrylates/methacrylates and vinyl/ethylenic monomers brings renewable component as well as economy to the resin and consequently to different compositions and coating formulations attained thereby.

We claim:

1. Acrylic polyols as solvent borne hydroxy functional acrylic copolymers/resin including an acrylic backbone which is a reaction product consisting of sole hydroxy functional monomer which is selectively anhydride modified castor oil as renewable material solely sourcing hydroxyl value in the range of 40 to about 90 mg KOH/gm and acid number value of maximum up to 15 mg KOH/gm, and monomers consisting of alkyl or aryl acrylates, alkyl methacrylates, styrene, derivative of styrene, vinyl/ethylenic type monomers and their derivatives and mixtures thereof free of any —OH functional monomers, said acrylic polyol reaction product having said solely sourced hydroxyl value in the range of 40 to about 90 mg KOH/gm and acid number value of maximum up to 15 mg KOH/gm sourced from said sole hydroxy functional monomer of said selectively anhydride modified castor oil for superior gloss retention as compared to gloss retention involving monomers free of any anhydride modification based sourcing of hydroxyl values and additional monomers including —OH functional groups.

2. The acrylic polyols according to claim 1, wherein said vinyl/ethylenic type monomers include vinyl aromatic monomers, unsaturated nitriles, vinyl esters, vinyl ethers, vinyl halides, vinylidene halides, unsaturated anhydrides, unsaturated dicarboxylic acids, acrylic and methacrylic acids, acrylamide, methacrylamide, fluorinated acrylics, silane functional vinyl/acrylics, crosslinking acrylics like diacrylates/methacrylates, functional acrylics with dual reactivity, conjugated dienes and mixtures thereof.

3. The acrylic polyols according to claim 1, further comprising high solids of up to 100% and renewable content of up to 50% having weight average molecular weights within the range of about 10000 to 100000 and having a glass transition temperatures (Tg) within the range of about −20° C. to about 50° C.

4. The acrylic polyols according to claim 1, wherein the average molecular weight is preferably in the range of 15000-50000.

5. A process for the synthesis of acrylic polyols comprising hydroxy functional acrylic copolymers/resin according to claim 1, comprising the steps of:

(a) providing the modified castor oil as sole hydroxy functional monomer which is selectively anhydride modified castor oil as renewable material solely sourcing hydroxyl value in the range of 40 to about 90 mg KOH/gm and acid number value of maximum up to 15 mg KOH/gm;

(b) providing the monomers for addition at a desired rate consisting of alkyl or aryl acrylates, alkyl methacrylates, styrene, derivative of styrene, vinyl/ethylenic type monomers and their derivatives and mixtures thereof free of any —OH functional monomers;

(c) providing free radical initiator for addition at a desired rate;

(d) copolymerizing the ingredients (a) and (b) in the presence of solvents in a desired temperature range adapted to control the free radical polymerization free of any chain-transfer agent to obtain said hydroxy functional acrylic copolymers/resin including an acrylic backbone which is a reaction product of (a) and (b) and having hydroxyl value in the range of 40 to about 90 mg KOH/gm and acid number value of maximum up to 15 mg KOH/gm sourced from said sole hydroxy functional monomer of said selectively anhydride modified castor oil.

6. The process for the synthesis of acrylic polyols according to claim 5, wherein the modified castor oil is used in the levels based on the desired hydroxyl value of the resin.

7. The process for the synthesis of acrylic polyols according to claim 5, wherein modified castor oil is provided within the range of about 10-50 wt. % and more preferably in the range of about 10-35 wt. % based on resin solids; wherein the monomers are provided in the range of 20 to 60 wt %, preferably in the range of 35 to 60 wt %; wherein the free-radical initiator is in the range of about 0.5 to about 10 wt. % based on the amount of monomers preferably within the range of about 1 to about 5 wt. %; most preferably in the range from about 1.5 to about 3.5 wt. %.

8. The process for the synthesis of acrylic polyols according to claim 5, wherein the reaction temperature range is within about 80° C. to about 160° C. and preferably is in the range of 100° C. to about 150° C. and, wherein the free-radical initiator is gradually added to the other components of the reaction during the course of the polymerization and preferably wherein the addition of the free-radical initiator and the monomer mixture to the reaction mixture is maintained at the same rate.

9. The process for the synthesis of acrylic polyols according to claim 5, wherein the solvents employed does not interfere with free-radical polymerization reaction or react with the monomers and include solvents selected from ethers, esters, ketones, aromatic and aliphatic hydrocarbons, glycol ether esters, or mixtures thereof.

10. The process for the synthesis of acrylic polyols according to claim 5, wherein the free radical initiators includes peroxide, hydroperoxide, or azo compound preferably the initiators with a decomposition temperature greater than about 100° C. and selected from tert-butyl hydroperoxide, di-tert-butyl peroxide, tert-butyl perbenzoate, cumenehydroperoxide, dicumyl peroxide.

11. A polyurethane composition comprising a reaction product of:
(a) acrylic polyols as solvent borne hydroxy functional acrylic copolymers/resin including an acrylic backbone which is a reaction product consisting of sole hydroxy functional monomer which is selectively anhydride modified castor oil as renewable material solely sourcing hydroxyl value in the range of 40 to about 90 mg KOH/gm and acid number value of maximum up to 15 mg KOH/gm, and
monomers consisting of alkyl or aryl acrylates, alkyl methacrylates, styrene, derivative of styrene, vinyl/ethylenic type monomers and their derivatives and mixtures thereof free of any —OH functional monomers,
said acrylic polyol reaction product having said solely sourced hydroxyl value in the range of 40 to about 90 mg KOH/gm and acid number value of maximum up to 15 mg KOH/gm sourced from said sole hydroxy functional monomer of said selectively anhydride modified castor oil for superior gloss retention as compared to gloss retention involving monomers free of any anhydride modification based sourcing of hydroxyl values and additional monomers including —OH functional groups; and
(b) an isocyanate.

12. The polyurethane composition according to claim 11, wherein the isocyanates include polyisocyanate, isocyanate-terminated prepolymer or blocked isocyanates and are selected from toluene diisocyanate, methylene diphenyl diisocyanate, polymeric methylene diphenyl diisocyanate, carbodiimide-modified methylene diphenyl diisocyanate, hydrogenated methylene diphenyl diisocyanate, isophoronediisocyanate, biurates & isocyanurate of hexamethylene di-isocyanate and isophoron di-isocyanate.

13. The polyurethane composition according to claim 11, further including adhesives, sealants, coatings, and elastomers.

14. A process for the preparation of a polyurethane composition according to claim 11 comprising the steps of reacting:
(a) acrylic polyols obtained by (i) providing the modified castor oil as sole hydroxy functional monomer which is selectively anhydride modified castor oil as renewable material solely sourcing hydroxyl value in the range of 40 to about 90 mg KOH/gm and acid number value of maximum up to 15 mg KOH/gm;
(ii) providing the monomers for addition at a desired rate consisting of alkyl or aryl acrylates, alkyl methacrylates, styrene, derivative of styrene, vinyl/ethylenic type monomers and their derivatives and mixtures thereof free of any —OH functional monomers;
(iii) providing free radical initiator for addition at a desired rate;
(iv) copolymerizing the ingredients (i) and (ii) in the presence of solvents in a desired temperature range adapted to control the free radical polymerization free of any chain-transfer agent to obtain said hydroxy functional acrylic copolymers/resin including an acrylic backbone which is a reaction product of (i) and (ii) and having hydroxyl value in the range of 40 to about 90 mg KOH/gm and acid number value of maximum up to 15 mg KOH/gm sourced from said sole hydroxy functional monomer of said selectively anhydride modified castor oil; with (b) an isocyanate,
at the desired NCO:OH ratio to obtain a polyurethane composition therefrom.

15. The process for the preparation of a polyurethane composition according to claim 14, wherein preferably the acrylic polyol and isocyanate is reacted in the ratio of 1:1.

16. The process for the preparation of a polyurethane composition according to claim 14, further comprising moisture curing in case of excess NCO groups in the polyurethane product.

17. Thermoset polymers comprising a reaction product of:
(a) acrylic polyols as solvent borne hydroxy functional acrylic copolymers/resin including an acrylic backbone which is a reaction product consisting of sole hydroxy functional monomer which is selectively anhydride modified castor oil as renewable material solely sourcing hydroxyl value in the range of 40 to about 90 mg KOH/gm and acid number value of maximum up to 15 mg KOH/gm, and
monomers consisting of alkyl or aryl acrylates, alkyl methacrylates, styrene, derivative of styrene, vinyl/ethylenic type monomers and their derivatives and mixtures thereof free of any —OH functional monomers, said acrylic polyol reaction product having said solely sourced hydroxyl value in the range of 40 to about 90 mg KOH/gm and acid number value of maximum up to 15 mg KOH/gm sourced from said sole hydroxy functional monomer of said selectively anhydride modified castor oil for superior gloss retention as compared to gloss retention involving monomers free of any anhydride modification based sourcing of hydroxyl values and additional monomers including —OH functional groups; and (b) an amino resin.

18. The thermoset polymers according to claim 17 wherein the amino resin includes melamine resin selected from hexamethoxymethylmelamines, such as Cymel 303 and Setamine US 138.

19. A process for the synthesis of thermoset polymers according to claim 17 comprising the steps of reacting:

(a) acrylic polyols obtained by (i) providing the modified castor oil as sole hydroxy functional monomer which is selectively anhydride modified castor oil as renewable material solely sourcing hydroxyl value in the range of 40 to about 90 mg KOH/gm and acid number value of maximum up to 15 mg KOH/gm;

(ii) providing the monomers for addition at a desired rate consisting of alkyl or aryl acrylates, alkyl methacrylates, styrene, derivative of styrene, vinyl/ethylenic type monomers and their derivatives and mixtures thereof free of any —OH functional monomers;

(iii) providing free radical initiator for addition at a desired rate;

(iv) copolymerizing the ingredients (i) and (ii) in the presence of solvents in a desired temperature range adapted to control the free radical polymerization free of any chain-transfer agent to obtain said hydroxy functional acrylic copolymers/resin including an acrylic backbone which is a reaction product of (i) and (ii) and having hydroxyl value in the range of 40 to about 90 mg KOH/gm and acid number value of maximum up to 15 mg KOH/gm sourced from said sole hydroxy functional monomer of said selectively anhydride modified castor oil; with (b) an amino resin to obtain the thermoset polymers therefrom.

20. A coating composition comprising:

(a) acrylic polyols as solvent borne hydroxy functional acrylic copolymers/resin including an acrylic backbone which is a reaction product consisting of sole hydroxy functional monomer which is selectively anhydride modified castor oil as renewable material solely sourcing hydroxyl value in the range of 40 to about 90 mg KOH/gm and acid number value of maximum up to 15 mg KOH/gm, and monomers consisting of alkyl or aryl acrylates, alkyl methacrylates, styrene, derivative of styrene, vinyl/ethylenic type monomers and their derivatives and mixtures thereof free of any —OH functional monomers, said acrylic polyol reaction product having said solely sourced hydroxyl value in the range of 40 to about 90 mg KOH/gm and acid number value of maximum up to 15 mg KOH/gm sourced from said sole hydroxy functional monomer of said selectively anhydride modified castor oil for superior gloss retention as compared to gloss retention involving monomers free of any anhydride modification based sourcing of hydroxyl values and additional monomers involving hydrophilic ionic groups including —OH functional groups;

(b) Cross linker; and (c) pigments.

21. The coating composition according to claim 20, adapted for a dry film thickness ranging from 20-75 microns favoring at least one or more i.e. primer, base coat, and top coat.

22. Acrylic polyols as solvent borne hydroxy functional acrylic copolymers/resin according to claim 1, wherein said selectively anhydride modified castor oil as sole hydroxyl functional monomer with hydroxyl value in the range of 40 to about 90 mg KOH/gm and acid number value of maximum up to 15 mg KOH/gm is maleic anhydride and succinic anhydride modified castor oil favoring at least 90% gloss retention after 500 hours and at least 68% gloss retention after 1000 hours under UV exposure.

23. A process for the synthesis of acrylic polyols comprising hydroxy functional acrylic copolymers/resin according to claim 5, wherein said selectively anhydride modified castor oil as sole hydroxyl functional monomer with hydroxyl value in the range of 40 to about 90 mg KOH/gm and acid number value of maximum up to 15 mg KOH/gm is maleic anhydride and succinic anhydride modified castor oil.

* * * * *